S. J. HALL.
BATTERY CONNECTION.
APPLICATION FILED FEB. 28, 1908.
994,744.
Patented June 13, 1911.
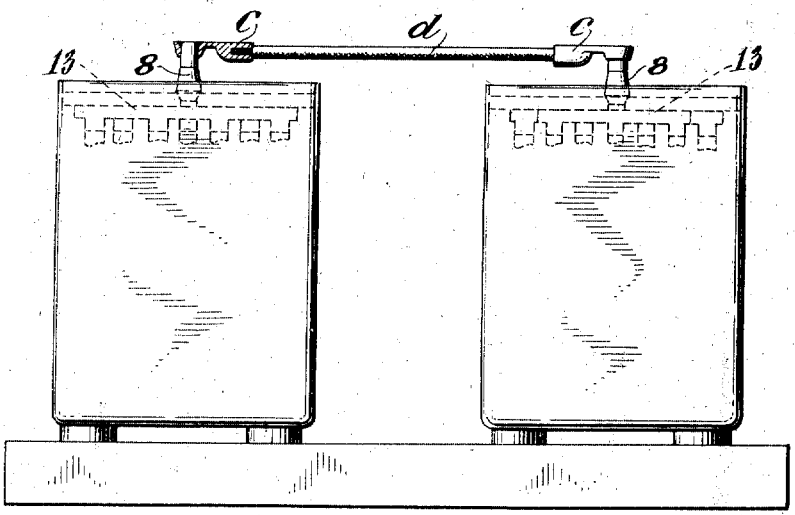
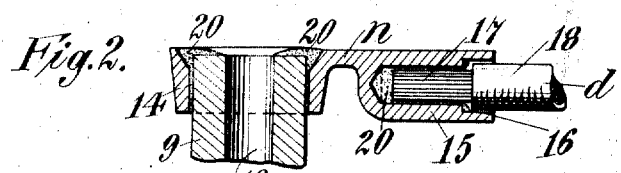
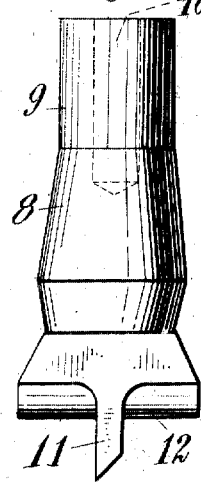
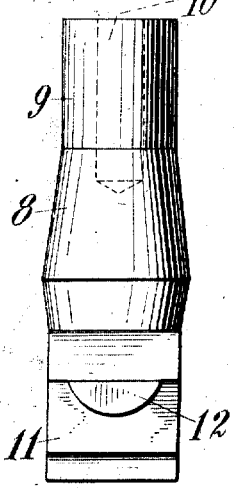
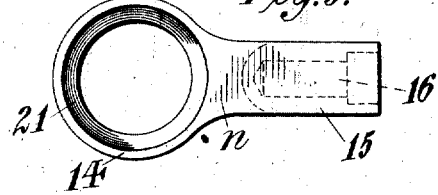
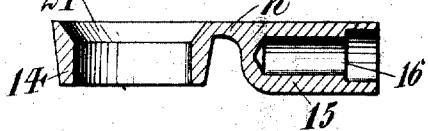

UNITED STATES PATENT OFFICE.

SIDNEY J. HALL, OF DEPEW, NEW YORK, ASSIGNOR TO GOULD STORAGE BATTERY COMPANY, A CORPORATION OF NEW YORK.

BATTERY CONNECTION.

994,744. Specification of Letters Patent. Patented June 13, 1911.

Application filed February 28, 1908. Serial No. 418,185.

*To all whom it may concern:*

Be it known that I, SIDNEY J. HALL, a citizen of the United States, residing at Depew, in the county of Erie and State of New York, have invented certain new and useful Improvements in Battery Connections, of which the following is a specification.

This invention relates to connecting devices for electric batteries.

The object of the invention is to provide a connecting device for uniting one cell of a battery to another by soldering the junctions, of such a character that well soldered connections may be made without resort to very high temperatures or long maintained temperatures that might tend to melt or distort the soft metal battery terminals. This object is accomplished by providing a short section of metal, such as a brass casting; at one end of the section is a receptacle, open top and bottom, within which a suitably formed battery terminal may be closely fitted; the battery terminal substantially closes the bottom side of the receptacle and leaves a cup shaped chamber with an open top to receive and hold the molten solder. The other end of the connecting device is provided with a socket to receive the end of a section of cable, or other suitable conductor, to which it is soldered at the junction. These two soldered junctions are made in succession and to the end that the heat applied to solder one junction may not be communicated to the other soldered junction and melt the solder there is provided a neck or portion of reduced cross section intermediate the ends of the connecting device; this neck is sufficiently reduced to retard the heat conduction while sufficient in extent to permit necessary electric conduction. The first described chamber is preferably arranged vertically with the opening at the top; the second described junction may be either vertical or horizontal, it is herein shown in a horizontal position.

The accompanying drawing illustrates the invention:

Figure 1 shows the connecting device uniting two adjacent cells; Fig. 2 is a vertical cross section; Fig. 3 is an elevation of a cell terminal; Fig. 4 is a view of the same at right angles to Fig. 3; Fig. 5 is a top plan view of the connector and Fig. 6 is a vertical, central cross section.

The connecting device *c* in its preferred form is a short casting of brass; the cells of battery have fixed terminals 8, cylindrical at the top 9, and may be perforated as shown at 10, the perforation being useful for connecting to any one of a series of cells, or in grouping cells, the projection 11 at the bottom of the part 8 and also the projection 12 at right angles thereto furnish convenient means for uniting the terminal with the lug or strip 13 uniting the several plates of like name of a cell together. In Fig. 1 I have only shown one terminal post 8 for each cell and one connector *c* for each cell with cable *d* connecting them. I have not shown the second terminal post and the connections therefrom toward other cells as it is understood that these may be of the same construction as those shown.

The connecting device *c* has a receptacle 14 at one terminal; this is preferably circular to fit the round terminal post 9 of the battery cell, the terminal and receptacle should fit as shown in Fig. 2. The terminal 9 should enter the receptacle 14 far enough to leave an open top chamber in the receptacle 14 to catch and hold molten solder introduced to solder the junction of the parts 9 and 14; the solder is shown at 20. The opposite end of the section or connecting device is in the form of a cylinder 15, counterbored as shown at 16 to receive the end 17 of a flexible conductor *d* and its acid proof insulating material 18. Molten solder 20 is introduced between the surfaces of the parts 15 and 17. These two junctions are made successively and it is desirable to guard against melting the solder at one junction while applying the solder at the other junction. For this purpose the connecting device *c* has an intermediate section of reduced mass, like a neck *n*; this retards heat conduction and is of sufficient extent to permit of necessary electrical conduction.

In the practical use of the connecting device the cells are assembled and set up and the connectors provided in pairs, as shown in Fig. 1; a pair of connectors *c* is united by a section of insulated flexible conductor or cable *d*, the rings 14 are placed over the terminals 9, and the junction is filled with fused metal or solder. The presence of the neck *n* prevents heat conduction during the soldering operation which might otherwise result in freeing the flexible conductor *d* from its junction with the terminal 15. The substantial union between the connector and the terminal post 9 is made at the end of the post where in melting the solder the heat can be directly applied so that neither a high temperature nor a long maintained heat is necessary to make a good union at this point. The terminal post 9, therefore, is not substantially heated, nor is there a great amount of heat that will be conducted through the connector to the soldered connection in the orifice at the other end of the connector. Moreover, because of the same feature of construction the connector can be readily unsoldered and separated from the post without such an amount of heat being applied as to be detrimental in these respects.

What I claim and desire to secure by Letters Patent is:

1. A battery connector composed of a short section of metal, and a socket at one end to receive a soldered connection to a cell said connector having an intermediate neck in mass sufficiently reduced to retard conduction of heat from one end to the other.

2. A battery connection, comprising a connector composed of a short section of metal and a terminal soldered to one end thereof for electrically connecting the connector to a battery cell, said connector having a section or neck of reduced mass intermediate the terminals of said section, said mass being sufficiently reduced to retard heat conduction and supply electric conduction to the extent required.

3. A connector for battery cells consisting of a piece of metal arranged and constructed at two points to receive soldered electrical connections and having a neck intermediate said points sufficiently reduced to materially retard the conduction of heat from one point to the other.

4. A connection for battery cells, comprising a strip of metal, a battery terminal soldered to one end of said strip, and a conducting member soldered to the other end of said strip, said strip at one end being in the form of a receptacle to surround and extend above the battery terminal and said strip having an intermediate zone sufficiently reduced to retard the conduction of heat from one end to the other.

5. A connector for battery cells consisting of an integral piece of metal arranged and constructed at two points to receive electrical connections of the fusible type and having an integral neck intermediate said points sufficiently reduced in cross section to materially retard the conduction of heat from one point to the other.

6. The combination with a circular terminal post of a storage battery of a connector having a circular opening at one end embracing said post, the walls of said opening extending upwardly and divergently beyond the end of said post, a soldered connection between the walls of said opening and the ends of said post and a flexible conductor connected to the other end of said connector said connector having a neck sufficiently reduced to retard the conduction of heat along the same.

7. A battery connection comprising a connector composed of a short section of metal, electrically conducting members soldered, one to each end of said strip, said connector having a section or neck of reduced mass intermediate its ends, said mass being sufficiently reduced to retard heat conduction and supply electric conduction to the extent required.

In testimony whereof, I have signed my name to this specification, in the presence of two subscribing witnesses.

SIDNEY J. HALL.

Witnesses:
A. H. SNYDER,
FRED. C. GEYER.